United States Patent
Sakai et al.

(10) Patent No.: US 7,798,188 B2
(45) Date of Patent: Sep. 21, 2010

(54) LAMINATE OF THERMOPLASTIC RESIN AND RUBBER AND PNEUMATIC TIRE USING THE SAME

(75) Inventors: Tomoyuki Sakai, Hiratsuka (JP); Yoshiaki Kirino, Hiratsuka (JP); Yoshihiro Soeda, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 12/089,350

(22) PCT Filed: Oct. 3, 2006

(86) PCT No.: PCT/JP2006/320149
§ 371 (c)(1),
(2), (4) Date: Apr. 4, 2008

(87) PCT Pub. No.: WO2007/043489
PCT Pub. Date: Apr. 19, 2007

(65) Prior Publication Data
US 2009/0131592 A1 May 21, 2009

(30) Foreign Application Priority Data
Oct. 4, 2005 (JP) .............................. 2005-291257

(51) Int. Cl.
*B60C 1/00* (2006.01)
*C08F 22/06* (2006.01)

(52) U.S. Cl. ...................... 152/510; 152/450; 152/458; 152/565; 525/190; 525/191; 525/192

(58) Field of Classification Search ................. 525/190, 525/191, 192; 152/450, 458, 565, 510
See application file for complete search history.

(56) References Cited

U.S. PATENT DOCUMENTS 5,910,544 A * 6/1999 Ozawa et al. ............... 525/178
5,938,869 A * 8/1999 Kaido et al. ................. 152/510
6,062,283 A * 5/2000 Watanabe et al. ........... 152/510
6,136,123 A 10/2000 Kaido et al.
2006/0182976 A1* 8/2006 Yamakawa et al. .......... 428/421

FOREIGN PATENT DOCUMENTS

| CA | 1066467 | 11/1979 |
|---|---|---|
| EP | 1666242 | 6/2006 |
| JP | 08258506 | 10/1996 |
| JP | 10025375 | 1/1998 |
| JP | 11240108 | 9/1999 |
| JP | 3320420 | 6/2002 |
| JP | 2005036043 | 2/2005 |
| JP | 2005075010 | 3/2005 |
| JP | 2005103760 | 4/2005 |
| JP | 2005226016 | 8/2005 |
| JP | 2006152156 | 6/2006 |
| JP | 2006224854 | 8/2006 |
| WO | WO-2005063482 | 7/2005 |

OTHER PUBLICATIONS

Machine Translation of JP2005-226016.*

* cited by examiner

*Primary Examiner*—Vasu Jagannathan
*Assistant Examiner*—Mark S Kaucher
(74) *Attorney, Agent, or Firm*—Connolly Bove Lodge & Hutz LLP

(57) ABSTRACT

A laminate of a thermoplastic resin and rubber comprising a thermoplastic resin layer (A) made of a matrix of a polyamide resin matrix containing an elastomer dispersed therein and an unvulcanized diene-based rubber layer (B) containing a diene-based rubber and a low molecular weight diene-based rubber having an acid anhydride group and having a weight average molecular weight of 500 to 50,000 laminated partially or totally in at least one layer each to form a laminate integrated at the time of vulcanization and a pneumatic tire using the same.

11 Claims, No Drawings

LAMINATE OF THERMOPLASTIC RESIN AND RUBBER AND PNEUMATIC TIRE USING THE SAME

RELATED APPLICATIONS

This application is a national stage application (under 35 U.S.C. §371) of PCT/JP2006/320149 filed Oct. 3, 2006, which claims benefit of Japanese application 2005-291257 filed Oct. 4, 2005, disclosure of which is incorporated herein by reference.

TECHNICAL FIELD

The present invention relates to a laminate of a thermoplastic resin and a rubber and a pneumatic tire using the same, more particularly relates to a laminate of a thermoplastic resin layer comprising a polyamide resin containing an elastomer dispersed therein and an unvulcanized diene-based rubber composition layer capable of bonding the thermoplastic resin layer therewith by vulcanization. The present invention further relates to a pneumatic tire using the above laminate, for example, as a tire inner liner, carcass layer and/or tie rubber layer, without using a binder layer.

BACKGROUND ART

Techniques utilizing a thermoplastic resin and a thermoplastic elastomer film as the inner liner (or an air barrier layer) of a pneumatic tire is known (e.g., see Japanese Patent Publication (A) No. 10-25375). This film has insufficient bondability with the carcass layer and tie rubber layer (i.e., cushioning material between a carcass layer and an inner liner), and therefor, it has been proposed to secure bondability by coating a tackifier/binder or by coextruding the film (e.g., see Japanese Patent No. 3320420 and Japanese Patent Publication (A) No. 11-240108).

DISCLOSURE OF THE INVENTION

Accordingly, the object of the present invention is to provide a laminate comprising a thermoplastic resin layer (A) comprising a polyamide resin matrix containing an elastomer dispersed therein and an unvulcanized diene-based rubber layer (B) integrated by vulcanization without using a binder layer and capable of using as the inner liner, carcass layer and/or tie rubber layer of a pneumatic tire.

In accordance with the present invention, there are provided a laminate of a thermoplastic resin and a rubber comprising a thermoplastic resin layer (A) comprising a polyamide resin matrix containing an elastomer dispersed therein and an unvulcanized diene-based rubber layer (B) containing a diene-based rubber and a low molecular weight diene-based rubber having an acid anhydride group and having a weight average molecular weight of 500 to 50,000 laminated partially or totally in at least one layer each to form a laminate integrated at the time of vulcanization and a pneumatic tire using the same as an inner liner, carcass layer or tie rubber layer thereof.

According to the present invention, by compounding, into the unvulcanized diene-based rubber layer (B), a reactive polymer, i.e., a low molecular weight diene-based rubber having an acid anhydride group, it is possible to bond a polyamide resin such as nylon therewith, without using a binder. Further, the reactive polymer is a low molecular weight liquid diene-based rubber having an acid anhydride group, and therefore, it is possible to impart not only the desired bondability, but also the tack important for tire-making. In this way, according to the present invention, it is possible to eliminate the use of a binder layer, and therefore, the process for producing the laminate and tire can be simplified. This is also economically advantageous.

BEST MODE FOR CARRYING OUT THE INVENTION

The singular forms ("a", "an", "the") used in the Description and the Claims should be understood as including the plural forms except when otherwise evident from the context.

The inventors were found that, without using a binder, a thermoplastic resin layer comprising a polyamide resin matrix containing an elastomer dispersed therein and an unvulcanized diene-based rubber layer obtained by, for example, adding, to a diene-based rubber layer, a reactive liquid rubber (i.e., the low molecular weight diene-based rubber) having an acid anhydride group, when using the above-mentioned laminate film of the thermoplastic resin layer (A) and unvulcanized diene-based rubber layer (B) as the inner liner, carcass layer or tie rubber layer of a pneumatic tire and, therefore, succeeded in obtaining a desired laminate of a rubber layer/thermoplastic resin layer. More particularly, the present invention relates to a laminate of a thermoplastic resin and a rubber comprising a thermoplastic resin layer (A) having a nylon or other polyamide resin as a matrix and an unvulcanized diene-based rubber layer (B) containing a diene-based rubber and a low molecular weight diene-based rubber having an acid anhydride group and having a weight average molecular weight of 500 to 50,000, preferably 1500 to 30,000, partially or totally laminated in at least one layer each to form a laminate made integral at the time of vulcanization.

According to the present invention, by using a rubber composition capable of mixing by a usual rubber use kneader such as a Banbury mixer, it becomes possible to secure bondability with a thermoplastic resin layer (A) having a polyamide resin as a matrix and possible to obtain a laminate of a thermoplastic resin layer (A) and a carcass layer and/or tie rubber layer having bondability with the thermoplastic resin layer (A) and a pneumatic tire using the same. Specifically, by using, as a carcass layer or tie rubber layer of a pneumatic tire, a compound of an unvulcanized diene-based rubber containing a diene-based rubber and low molecular weight diene-based rubber having an acid anhydride group and capable of being kneaded by a rubber use internal mixer (e.g., Banbury mixer, etc.) it is possible to produce a member of a pneumatic tire, without requiring the use of a binder layer, and therefore, it is possible to simplify the production process of a tire.

The laminate of the thermoplastic resin and rubber according to the present invention can be produced by integrally laminating a laminate of a thermoplastic resin layer or film (A) of a thermoplastic elastomer composition containing a polyamide resin matrix containing an elastomer dispersed therein and an unvulcanized diene-based rubber composition (B) containing a diene-based rubber and a low molecular weight diene-based rubber having an acid anhydride group, when vulcanizing the diene-based rubber composition (B). The film or layer (A) preferably has an air permeation coefficient of $25 \times 10^{-12}$ cc·cm/cm²·sec·cmHg or less, more preferably 0.1 to 20 cc·cm/cm² sec·cmHg (determined according to JIS K7126 "Gas Permeation Test Method of Plastic Films and Sheets (Method A)") and a Young's modulus of 1 to 500 MPa, more preferably 1 to 400 MPa (determined according to JIS K6251 "Tensile Test Method of Vulcanized Rubber"). This layer (A) can be obtained by extruding a thermoplastic elastomer comprised of a matrix (i.e., continuous phase) of, for example, at least one polyamide-based resin (e.g., Nylon 6 (N6), Nylon 66 (N66), Nylon 46 (N46), Nylon 11 (N11), Nylon 12 (N12), Nylon 610 (N610), Nylon 612 (M612), Nylon 6/66 copolymer (N6/66), Nylon Jun. 66, 19610 copolymer (N6/66/610), Nylon MXD6 (MXD6), Nylon 6T, Nylon 6/6T copolymer, Nylon 66/PP copolymer, Nylon 66/PPS copolymer) in which at least one elastomer such as a diene-based rubber and its hydrates, an olefin-based rubber, a halogen-containing rubber, a silicone rubber, a sulfur-containing rubber, a fluororubber, a thermoplastic elastomer, an isobutylene-paramethyl styrene copolymer or the like is dispersed.

The weight ratio of the polyamide resin forming the matrix and the elastomer forming the dispersed phase is not particularly limited, but 80 parts by weight or more of the elastomer, based upon 100 parts by weight of the polyamide resin, is preferable. Specifically, the polyamide resin and the elastomer of the unvulcanized rubber are melt kneaded by a twin-screw kneading extruder or the like to make the elastomer ingredient disperse in the thermoplastic resin forming the continuous layer. When vulcanizing the elastomer ingredient, the vulcanization agent is added, while kneading, to thereby dynamically vulcanize the elastomer ingredient. Further, the various types of compounding agents (except for a vulcanization agent) to be added to the polyamide resin and/or elastomer ingredient may be added before kneading or during kneading. The kneader usable for kneading the polyamide resin and elastomer ingredient is not particularly limited. A screw extruder, kneader, Banbury mixer, twin-screw kneading extruder etc. may be mentioned, but among these a twin-screw kneading extruder is preferably used. Note that the production method of the polyamide resin layer (A) etc. are described in further detail in Japanese Patent Publication (A) No. 8-258506 etc. In the present invention, the methods described therein may be used.

The unvulcanized diene-based rubber composition (B) forming the laminate according to the present invention may contain a diene-based rubber and a low molecular weight diene-based rubber composition having an acid anhydride group (e.g., an anhydrous maleic acid group, anhydrous phthalic acid group etc.). By making the composition (B), for example, into a sheet and laminating the same with the layer (A) and vulcanizing the diene-based rubber (e.g., 140 to 190° C. and 5 to 60 min), the thermoplastic resin layer (or film) (A) and unvulcanized diene-based rubber composition (B) can be made into an integral laminate, without using a binder layer. This laminate can be used as an inner liner of a pneumatic tire and further as a carcass layer or tie rubber layer as is in the conventional production process of a pneumatic tire.

As the diene-based rubber compounded into the diene-based rubber layer (B) of the present invention, for example, it is possible to use any diene-based rubber capable of using for tires etc. Specifically, various types of natural rubber (NR), various types of polybutadiene rubber (BR), various types of polyisoprene rubber (IR), various types of styrene-butadiene copolymer rubber (SBR), acrylonitrile-butadiene copolymer rubber (NBR), styrene-isoprene copolymer rubber, styrene-isoprene-butadiene copolymer rubber and other diene-based rubber may be mentioned. These may be used alone or in any mixtures thereof. Note that the diene-based rubber referred to here does not include an epoxylated natural rubber or other diene-based rubber modified with a functional group.

The low molecular weight diene-based rubber having an acid anhydride group and having a weight average molecular weight of 500 to 50000, more preferably 500 to 30,000, used in the present invention is a known polymer. For example, it is possible to produce this rubber using a compound having an acid anhydride group (e.g., anhydrous maleic acid, anhydrous phthalic acid etc.), as a comonomer, or reacting a diene-based rubber and an acid anhydride. Specifically, it is possible to use products commercially available from Nippon Petrochemicals K.K., Sartomer Inc. etc. As the low molecular weight diene-based rubber having an acid anhydride group, maleated liquid polybutadiene and maleated liquid polyisoprene are preferable, and maleated liquid polybutadiene is particularly preferable. The compounding ratio of the low molecular weight diene-based rubber having an acid anhydride group to the diene-based rubber is not particularly limited, but 5 to 50 parts by weight of the low molecular weight diene-based rubber having an acid anhydride group, based upon 100 parts by weight of the diene-based rubber, is preferable from the viewpoint of enhancing the desired effects.

The composition forming the layers (A) and (B) forming the laminate according to the present invention may include, in addition to the above essential ingredients, carbon black, silica or another filler, a vulcanization or cross-linking agent, a vulcanization or cross-linking accelerator, various types of oils, an antioxidant, a plasticizer and other various types of additives generally compounded for tire use and other general rubber use and resin use. These additives may be used by mixing according to a general method to obtain a composition. The amounts of these additives may be made conventional general compounding amounts so long as the object of the present invention is not adversely affected.

EXAMPLES

Examples will now be used to further explain the present invention, but the scope of the present invention is not limited to these Examples.

Examples 1 to 2 and Comparative Examples 1 to 5

Preparation of Diene-Based Rubber Composition (B)

In each of the formulations shown in Table I, the ingredients other than the vulcanization accelerator and sulfur were kneaded in a 2-liter internal mixer for 5 minutes. When reaching 165±5° C., the contents were discharged to obtain a master batch. Into this master batch, the vulcanization accelerator and the sulfur were mixed by an open roll to obtain an unvulcanized rubber composition. The rubber composition obtained was used to evaluate the bondability. The results are shown in Table I.

TABLE I

|  | Comp. Ex. 1 | Comp. Ex. 2 | Comp. Ex. 3 | Comp. Ex. 4 | Comp. Ex. 5 | Ex. 1 | Ex. 2 |
| --- | --- | --- | --- | --- | --- | --- | --- |
| Formulation (parts by weight) | | | | | | | |

TABLE I-continued

|  | Comp. Ex. 1 | Comp. Ex. 2 | Comp. Ex. 3 | Comp. Ex. 4 | Comp. Ex. 5 | Ex. 1 | Ex. 2 |
|---|---|---|---|---|---|---|---|
| SBR*[1] | 50 | 50 | 50 | 50 | 50 | 50 | 50 |
| Natural rubber*[2] | 50 | 50 | 50 | 50 | 50 | 50 | 50 |
| Epoxy-containing polymer*[3] | — | 25 | — | — | — | — | — |
| Liquid BR*[4] | — | — | 25 | — | — | — | — |
| Epoxylated liquid BR*[5] | — | — | — | 12 | 25 | — | — |
| Maleated liquid BR*[6] | — | — | — | — | — | 12 | 25 |
| Carbon black*[7] | 60 | 60 | 60 | 60 | 60 | 60 | 60 |
| Stearic acid*[8] | 1 | 1 | 1 | 1 | 1 | 1 | 1 |
| Zinc oxide*[9] | 3 | 3 | 3 | 3 | 3 | 3 | 3 |
| Sulfur*[10] | 3 | 3 | 3 | 3 | 3 | 3 | 3 |
| Vulcanization accelerator*[11] | 1 | 1 | 1 | 1 | 1 | 1 | 1 |
| Evaluated physical properties |  |  |  |  |  |  |  |
| Bond-ability | − | + | − | − | − | ++ | + |
| Tack | 120 | 80 | 170 | 190 | 230 | 390 | 450 |

Notes of Table I
*[1]SBR Nipol 1502 made by Nippon Zeon K.K.
*[2]RSS#3
*[3]Polyethylene-based binder "Bondfast 7B" made by Sumitomo Chemical K.K.
*[4]Liquid polybutadiene "Polyoil" made by Nippon Zeon K.K.
*[5]Epoxylated liquid polybutadiene "E-1800-6.5" (molecular weight: 1800) made by Nippon Petrochemicals K.K.
*[6]Maleinated liquid polybutadiene "M-2000-20" (molecular weight: 2000) made by Nippon Petrochemicals K.K.
*[7]GPF grade carbon black "HTC#G" made by Nippon Techno-Carbon K.K.
*[8]Stearic acid "Beads Stearic Acid YR" made by NOF Corporation K.K.
*[9]Zinc oxide "Zinc Oxide Type 3" made by Seido Chemical Industrial K.K.
*[10]Oil-extended sulfur made by Tsurumi Chemical Industry K.K.
*[11]Thiuram-based vulcanization accelerator "TOT-N" made by Ouchi Shinko Chemical K.K.

Evaluation of Bondability

A thermoplastic TPR film extruded by the usual sheet-forming method (i.e., a film having Nylon 6.66 as a continuous phase and a dynamically vulcanized butyl-based rubber as a dispersed layer) and a 2 mm sheet of an unvulcanized rubber composition having the formulation described in each Example of Table I were superposed, without using a binder layer and vulcanized at 180° C. for 10 minutes to laminate them. The resultant laminate was cut into a No. 2 dumbbell shape, then the center of the thermoplastic TPR film was given a cut (5 mm) in the axial direction to prepare a sample. This was repeatedly subjected 500,000 times to continuous tensile strain of a stroke of 10 mm with a chuck distance of 60 mm by a De Mattia crack growth tester made by Uejima Seisakusho K.K. in an atmosphere of 70° C. The film peeling after the test was evaluated by the following judgment criteria.

++: No film peeling at all

+: Slight peeling observed from the cutting portion, with rubber material broken −: Interfacial peeling between film/rubber from the cutting portion Evaluation of Tack An unvulcanized rubber composition having the formulation described in each Example in Table I of a (width) 10× (length) 200×(thickness) 2 mm and a press bonded film (i.e., a sheet having Nylon 6.66 as a continuous phase in which an elastomer is dispersed) of a 70 mm (width)×100 mm (length)×0.2 mm (thickness) were prepared. The tackiness (gw) measured by a PICMA tack tester made by Toyo Seiki K.K. in an atmosphere of a room temperature of 25° C. and a humidity of 60% under conditions of a press bonding rate of 500 mm/min was calculated. The larger this value, the larger the tackiness.

INDUSTRIAL APPLICABILITY

As explained above, according to the present invention, it is possible to laminate together the thermoplastic resin layer (A), for example, as the inner liner of a pneumatic tire and an unvulcanized rubber composition (B) of a low molecular weight diene-based rubber having an acid anhydride group, for example, as a tire carcass layer or tie rubber layer simultaneously with vulcanization of the unvulcanized rubber composition (B), without using a binder layer, and therefore, it is possible to simplify the production process of a pneumatic tire.

The invention claimed is:

1. A pneumatic tire using a two layer laminate of a thermoplastic resin and a rubber; wherein said laminate consists of a first thermoplastic resin layer (A), wherein said first thermoplastic resin layer comprises a polyamide resin matrix containing an elastomer dispersed therein and a second unvulcanized diene-based rubber layer (B), wherein said second unvulcanized diene-based rubber layer comprises a diene-based rubber, wherein a low molecular weight diene-based rubber having an acid anhydride group and having a weight average molecular weight of 500 to 50,000, partially or totally laminated in at least one layer each to form a laminate integrated at the time of vulcanization, and wherein the two layer laminate replaces the combination of (i) an inner liner and (ii) (a) a carcass layer or (b) a carcass layer and a tie rubber layer.

2. A pneumatic tire as claimed in claim 1, wherein the thermoplastic resin layer (A) comprises a thermoplastic elastomer containing a polyamide resin matrix containing at least partially dynamically vulcanized elastomer discontinuously dispersed therein.

3. A pneumatic tire as claimed in claim 1, wherein the elastomer of the thermoplastic resin layer (A) is at least partially dynamically vulcanized elastomer halide of an isobutylene-paramethylstyrene copolymer.

4. A pneumatic tire as claimed in claim 1, wherein the diene-based rubber is at least one rubber selected from the group consisting of natural rubber, polyisoprene rubber, polybutadiene rubber, styrene-butadiene copolymer rubber and acrylonitrile-butadiene copolymer rubber.

5. A pneumatic tire as claimed in claim 1, wherein the low molecular weight diene-based rubber is a maleated liquid polybutadiene and/or maleated liquid polyisoprene rubber.

6. A pneumatic tire as claimed in claim 2, wherein the at least partially dynamically vulcanized elastomer of the thermoplastic resin layer (A) is a halide of an isobutylene-paramethylstyrene copolymer.

7. A pneumatic tire as claimed in claim 2, wherein the diene-based rubber is at least one rubber selected from the group consisting of natural rubber, polyisoprene rubber, polybutadiene rubber, styrene-butadiene copolymer rubber and acrylonitrile-butadiene copolymer rubber.

8. A pneumatic tire as claimed in claim 3, wherein the diene-based rubber is at least one rubber selected from the group consisting of natural rubber, polyisoprene rubber, polybutadiene rubber, styrene-butadiene copolymer rubber and acrylonitrile-butadiene copolymer rubber.

9. A pneumatic tire as claimed in claim 2, wherein the low molecular weight diene-based rubber is a maleated liquid polybutadiene and/or maleated liquid polyisoprene rubber.

10. A pneumatic tire as claimed in claim 3, wherein the low molecular weight diene-based rubber is a maleated liquid polybutadiene and/or maleated liquid polyisoprene rubber.

11. A pneumatic tire as claimed in claim 4, wherein the low molecular weight diene-based rubber is a maleated liquid polybutadiene and/or maleated liquid polyisoprene rubber.

* * * * *